United States Patent
McIntosh

[15] 3,655,957
[45] Apr. 11, 1972

[54] CONTROL SYSTEM FOR A MACHINE TOOL

[72] Inventor: Michael D. McIntosh, Greencastle, Pa.
[73] Assignee: Landis Tool Company
[22] Filed: Nov. 26, 1969
[21] Appl. No.: 880,078

[52] U.S. Cl. ................235/151.11, 340/146.2, 51/165
[51] Int. Cl. ...............................G05b 1/01, G06f 7/38
[58] Field of Search ............340/146.2, 149; 318/286, 600; 51/165.71, 165.74, 165 TP, 165; 235/177

[56] References Cited

UNITED STATES PATENTS

| | | | |
|---|---|---|---|
| 2,953,773 | 9/1960 | Nicolantonio, Jr. | 340/146.2 |
| 3,241,114 | 3/1966 | Zieper et al. | 340/146.2 |
| 3,157,971 | 11/1964 | Snyder | 51/165.91 |
| 3,210,853 | 10/1965 | Wiatt | 51/165 TP |
| 3,466,976 | 9/1969 | Price | 51/165 |
| 2,885,655 | 5/1959 | Smoliar | 235/177 |

Primary Examiner—Eugene G. Botz
Attorney—Diller, Brown, Ramik & Holt

[57] ABSTRACT

A machine tool control system is described which includes an adder arranged to add a first binary number, representative of a sensed dimension of a workpiece, to the bit by ones complement of a second binary number, representative of a desired dimension of the workpiece. Whenever the first binary number is greater than the second binary number, at least one of the sum outputs from the adder represents a zero logic condition, and a one logic condition exists on the carry output from the adder. Whenever the first and second binary numbers are equal, the sum outputs from the adder results in all ones and the carry output is in a zero logic condition. The sum output connections from the adder are coupled to four inputs of a five-input AND circuit. The fifth input is connected to a lead providing a logical one output upon the match of the next preceding digit as determined by a preceding comparator. The carry output connection from the adder is coupled to one input of a two-input AND circuit which has its second input connected to a lead providing a match logical one output from the preceding comparator. The output from the five-input AND circuit provides a retract signal for the movement of a machine tool element, such as a grinding wheel, relative to a workpiece. The output from the two-input AND circuit provides a control signal for signalling an advance of the machine tool element relative to a workpiece.

10 Claims, 2 Drawing Figures

CONTROL SYSTEM FOR A MACHINE TOOL

This invention relates, in general, to new and useful improvements in control systems for machine tools. In particular, the invention relates to a control system which utilizes binary signal data representative of a desired dimension for a workpiece, and a sensed dimension of a workpiece for developing advance and retract control signals for moving a machine tool element relative to a workpiece.

It is an object of the present invention to provide a control system for a machine tool which will operate automatically to machine a workpiece to a predetermined dimension.

Another object is to provide a control system for a machine tool which pre-programs a machine tool to machine a preselected dimension without regard to the skill, time or manual operation necessary to produce a similar result by trial and error.

A further object is to provide a control system for a machine tool which uses binary signal data representative of a workpiece dimension as sensed during a machining operation and binary signal data representative of a desired dimension for a workpiece for controlling the feed mechanism in a machine tool.

In accordance with this invention, a grinding wheel support may be automatically positioned in response to advance and retard control signals developed by a control system from first and second binary signals representative respectively of a desired dimension for a workpiece and a workpiece dimension. The control system makes use of an adder as its principal element. The adder is provided with one input which receives a binary signal representative of a sensed dimension of a workpiece and a second binary signal which is the bit by bit one's complement of a binary signal representation of a desired dimension for a workpiece. The adder functions to add the binary signal representative of the sensed dimension to the bit by bit complement of the other binary signal. The adder functions to provide at all of its sum outputs logical one conditions whenever the two binary signals are equal, and to provide a logical one condition on its carry output whenever the binary signal representative of the sensed dimension is greater than the other binary signal.

It is a feature of the present invention to utilize the carry output signal from the adder for developing a control signal calling for an advance of a machine tool element relative to a workpiece, and to use the sum outputs for providing a control signal calling for the retraction of a machine tool element relative to a workpiece.

It is a further feature of the invention that the aforementioned sum outputs and carry output be fed to respective AND circuits each of which has one additional input, the additional inputs being connected to means for indicating a previous match of a high order digit than the digit corresponding to the binary signals fed to the adder.

With the above and other objects in view, as will hereinafter appear, the nature and features of the invention will be more clearly understood by reference to the following description, the appended claims and the illustrations set out in the accompanying drawings:

Figure 1:
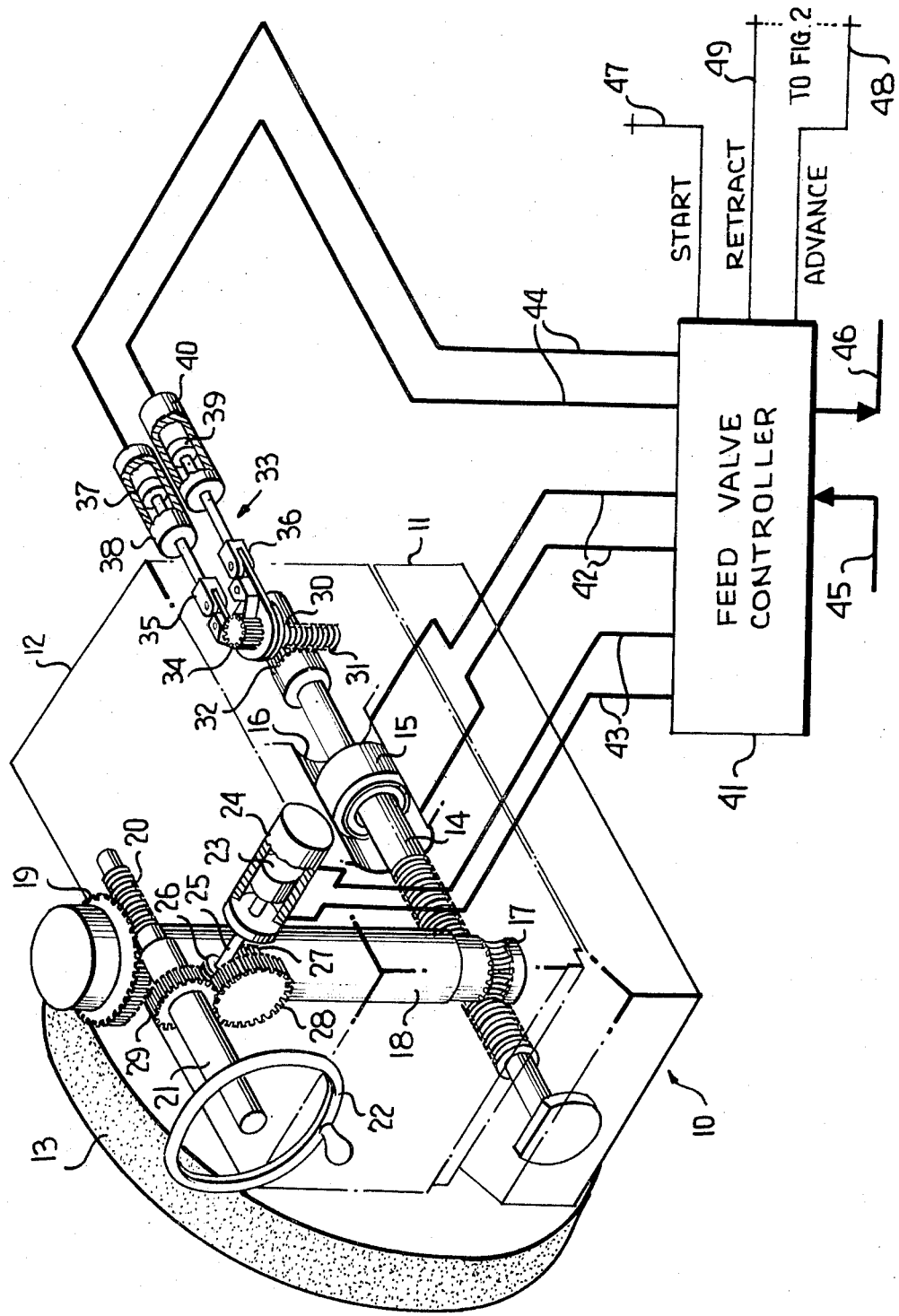
FIG. 1 is a diagrammatic view showing the feed mechanism of a grinding machine, and a controller therefor.

Referring now to the drawings in detail, it will be seen that there is illustrated in FIG. 1 a grinding machine which is generally referred to by the numeral 10. The grinding machine 10, as illustrated in FIG. 1, is of conventional construction and includes a bed 11. The bed 11 has mounted thereon in a conventional manner for longitudinal sliding movement, a work carriage or support (not shown) which is provided at opposite ends with a conventional type headstock and tailstock. A workpiece W (illustrated schematically in FIG. 2) may be mounted between the headstock and tailstock for rotation about a predetermined axis and for longitudinal shifting with the work support or carriage.

A grinding wheel support 12 is slidably mounted on the bed 11 for controlled movement traversely of the work support (not illustrated) in a conventional manner. A grinding wheel 13 is carried by a wheel support 12 for rotation. The grinding wheel 13 is driven by means of an electric motor (not illustrated).

It is to be understood that the grinding wheel 13 is fixed longitudinally of the bed 11, but is shiftable traversely of the bed 11 both for the purpose of grinding different dimensions on a workpiece W and to compensate for variations in the diameter of the grinding wheel 13. With the grinding wheel 13 in a retracted position, the workpiece W will be positioned longitudinally of bed 11 with one of the portions thereof in alignment with grinding wheel 13.

After the workpiece W has been properly positioned in alignment with the grinding wheel 13, the grinding wheel 13 is advanced towards the workpiece W when the grinding operation is performed. In the past, automatic feed mechanisms for the grinding wheel support 12 to effect automatically the repeated grinding of workpiece portions to a selected diameter, have been provided. The purpose of this invention is to provide a control system responsive to first and second binary signals representing, respectively, a desired and actual dimension of a workpiece for controlling the actuation of a feed mechanism which advances and retracts the grinding wheel 13 relative to the workpiece W so that each diameter of the workpiece W will be accurately ground after an initial setting of the machine and control system.

The feed mechanism for advancing and retracting the wheel support 12 for a grinding operation includes a feed screw 14 which is slidably mounted in the bed 11. The feed screw 14 carries a piston 15 which is mounted within a cylinder 16 to effect rapid advancing and retracting movements of the feed screw 14.

The feed screw is in threaded engagement with a worm wheel 17 formed on the lower end of a vertical shaft 18. The vertical shaft 18 is carried by the wheel support 12 and extends vertically therethrough. At the upper end of the vertical shaft 18, there is positioned another worm wheel 19. The worm wheel 19 is in operative engagement with a worm 20 carried by a hand wheel shaft 21 which supports a forwardly facing hand wheel 22. The shaft 21 may be selectively rotated by either the hand wheel 22 or by means of a piston 23 which is mounted within a cylinder 24. The piston 23 is coupled thereto by means of a shaft 25 and a rack member 26 which is meshed with a pinion 27. The pinion 27 is directly coupled to a gear 28 which is meshed with a gear 29 carried by the shaft 21.

The feed screw 14 may also be utilized for advancing and retracting the wheel support 12 by being rotated. This is accomplished by means of a shaft 30 having a worm 31 meshed with a worm wheel 32 carried by the feed screw 14. A further mechanism is provided for effecting the rotation of the shaft 30. This feed mechanism is generally referred to by the numeral 33.

The mechanism 33 is an incremental mechanism and includes, at the opposite end of the shaft 30 from the worm 31, a ratchet 34 which has associated therewith a pair of pawls 35 and 36 which may be actuated to rotate selectively the shaft 30 in a predetermined direction. The pawl 35 is actuated by a piston 37 mounted in a fluid cylinder 38. The pawl 36 is actuated by a piston 39 mounted in a fluid cylinder 40.

A feed valve controller 41 is provided for selectively actuating the cylinder 16, the cylinder 24, and cylinders 38 and 40. The cylinder 16 is connected to the feed valve controller 41 by a pair of hydraulic fluid conduits 42. The cylinder 24 is connected to the feed valve controller 41 by a pair of hydraulic fluid conduits 43. Cylinders 38 and 40 are each connected to the feed valve controller 41 by pneumatic fluid conduits 44. The feed valve controller 41 is provided with a hydraulic fluid input line 45 and an exit line 46 which are connected to a suitable pump (not shown) in a conventional manner. The feed valve controller 41 is provided with a start input connection 47 which may be manually operated to begin a grinding operation. If desired, the start input connection 47 may be energized by a transducer (not shown) which automatically signals the presence of a workpiece in position ready for grinding in a conventional manner. Advance and retract signals are fed respectively to the feed valve controller 41 by leads 48 and 49 which are adapted to be connected to the electronic control system of the present invention.

Figure 2:
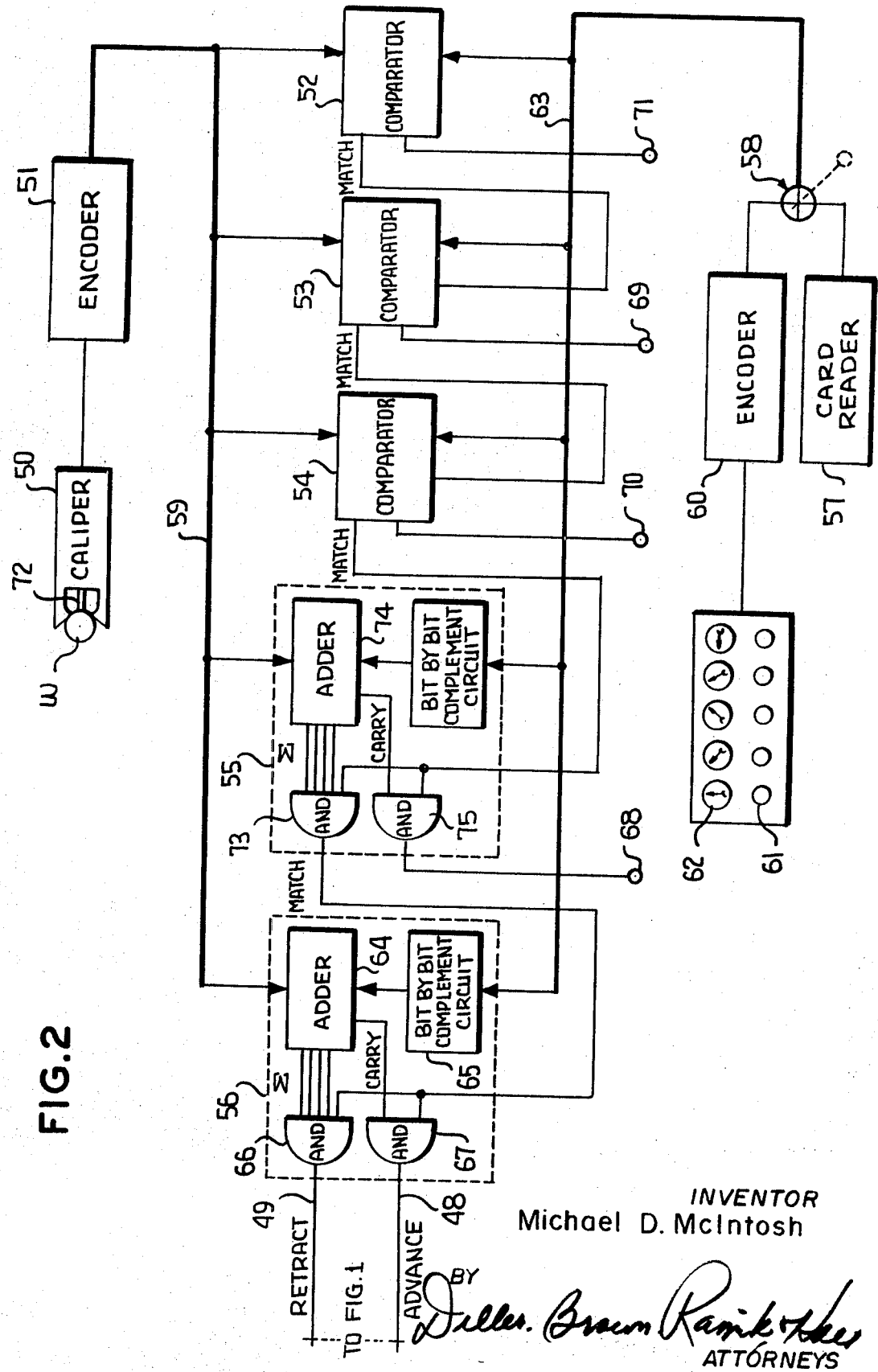
FIG. 2 is a block diagram of a control system, incorporating the present invention, for providing advance and retract signals.

Referring now in detail to FIG. 2, a control system for developing advance and retract signals which are to be fed to the feed valve controller 41 (FIG. 1) via connecting leads 48 and 49 is illustrated. The control system includes a caliper 50 which is arranged to sense a diameter of the workpiece W. The caliper 50 includes a probe 72 which is connected to a core of a transducer. The probe 72, as illustrated, is held in engagement with the workpiece W by means of a spring (not shown). The details of a suitable caliper 50 are shown in FIG. 1 of U.S. Pat. No. 3,157,971, granted Nov. 24, 1964. The output of the caliper 50 is coupled to an encoder 51 for transforming the output of the caliper 50 into binary signal data representative of the sensed diameter of the workpiece W. Binary signal data from the output of the encoder 51 is fed as a first input to a plurality of comparators 52–56 via wiring 59. Each comparator is arranged to receive binary data indicative of a single digit associated with the dimension of workpiece W as sensed by the caliper 50.

Binary signal data representative of a desired dimension for the workpiece W can be obtained from a card reader 57 or other source of stored binary data as desired. The output from the card reader 57 is coupled to an input selector 58 which is arranged to receive, alternatively, binary signal data representative of a desired diameter for the workpiece W from an encoder 60 which has its input arranged to receive from a combination visual indicator 61 and digit dimension setting switches 62. The input selector 58, depending on its setting, feeds either the output from card reader 57 or the output from encoder 60 to a second input of each of the comparators 52–56 via wiring 63.

Each of the comparators 52–55 is of similar construction to the comparator 56. Comparator 56 includes an adder 64 having one input connected to the wiring 59 for receiving binary signals representative of the last significant digit of the workpiece W as sensed by the caliper 50. The second input to the adder 64 is provided from bit by bit complement circuit (inverter) 65 which has its input coupled to receive binary signal data representative of the last significant digit of the desired dimension for the workpiece W as developed by encoder 60 or from card reader 57. The sum outputs from the adder 64 are coupled as individual inputs to five-input AND circuit 66. The carry output from the adder 64 is coupled to one input of a two-input AND circuit 67. The fifth input to the AND circuit 66 is provided from the output of a five-input AND circuit 73 associated with an adder 74 forming part of comparator 55. A second input for the AND circuit 67 is similarly connected to the output of the just-mentioned AND circuit 73 associated with the adder 74 forming part of comparator 55. The output from AND circuit 66 is connected to input lead 49 of the feed valve controller 41 (FIG. 1) so as to provide a retract control signal thereto. The output from the AND circuit 67 is connected to input lead 48 of the feed valve controller 41 so as to provide an advance control signal thereto.

As illustrated, comparator 55 is constructed in the same manner as the comparator 56 and includes a two-input AND circuit 75 which receives in one of its inputs a carry output from the adder 74 forming part of the comparator 55. As illustrated, the output from the two-input AND circuit 75 is connected to terminal 68. Terminals 69 and 70, associated respectively with comparators 53 and 54 are similarly connected to corresponding AND circuits (not shown) forming part of the comparators 53 and 54. Terminal 71 is connected directly to the carry output from an adder (not illustrated) associated with the comparator 52 which, unlike the comparators 53–56, does not utilize a two-input AND circuit for processing the carry output from its associated adder. The terminals 68–71 provide signals indicating the condition of the comparators 52–56 and may be utilized, for example, to energize indicator lights (not shown) or the like. It will be appreciated that signals appearing on terminals 68–71 may be utilized to gate [the adder forming part of] the next succeeding comparator in each case, and similarly the condition of the carry output connection to each of the adders associated with the comparators 52–55 may be utilized, if desired, to gate the [adder forming part of the] next succeeding comparator.

OPERATION

In the operation of the feed mechanism for the grinding wheel support 12, a start signal is applied to the start input lead 47 to initiate operation of the feed mechanism for the grinding wheel support 12, the rapid feeding thereof is effected by moving the feed screw 14 axially by the piston 15. The threads of the feed screw 14 engage the teeth of the worm wheel 17 on the vertical shaft 18, which is carried by the wheel support 12, so that the shaft 18 and the wheel support 12 move with the endwise movement of the feed screw 14.

At the end of the rapid feed movement, the grinding feed is continued by movement of the piston 23 to the left, causing rotation of the hand wheel 22, the hand wheel shaft 21 and the worm 20. The rotation of the worm 20, through the worm wheel 19, effects the rotation of the vertical shaft 18 in the wheel support 12. As the worm wheel 17 rotates, it functions as a pinion in engagement with the threads of the feed screw 14 and advances the support 12 relative to the feed screw 14 for a grinding operation.

At the end of the movement of the piston 23, if the work has not yet been ground to the desired dimension, sensed by the caliper 50, the incremental feed is initiated by action of the control system illustrated in FIG. 2 as will be made clear below. For purposes of illustration, let it be assumed that the sensed dimension of the workpiece W as measured by the caliper 50 corresponds very closely to the desired dimension of the workpiece W, and all digits except the last significant digit are correct as a result of the rapid and grinding feed movements discussed above. In these circumstances, a binary signal appears at the output of the encoder 51 which is representative of the last significant digit of the diameter of the workpiece W as measured by the caliper 50. The binary signal is coupled to a first input of the adder 64, forming part of the comparator 56, by wiring 59. A second input to the adder 64 is provided by the bit by bit complement circuit 65 which, in turn, receives a binary signal from the wiring 63 representative of the last significant digit of the desired dimension for the workpiece W as determined by the card reader 57 or the setting of the digit switches 62, depending on the position of the input selector 58.

The adder 64 operates to add the binary signal representing the last significant digit which it receives via wiring 59 to the bit by bit complement 65 of the binary signal representing the last significant digit of the desired dimension of the workpiece W as determined by the card reader 57 or the digit switches 62. Since one binary number is less than another, if the first number plus the bit by bit complement of the second number results in a carry, a carry output appears from the adder 64 so long as the binary number fed from wiring 59 is greater than the binary number fed from wiring 63. The carry output from the adder 64 is coupled via the AND circuit 67 to the advance lead 48 thereby providing an input to the feed controller 41 which signals the need for further grinding.

Since the workpiece has not, as yet, been ground to the desired dimension as determined by the control system, the increment feed is initiated by the reciprocation of the piston 37 which actuates the pawl 35 to rotate the ratchet 34. The rotation of the ratchet 34 results in the rotation of the shaft 30 and the worm 31 which, in turn, drives feed screw 14 through the worm wheel 32. As the feed screw 14 rotates, the worm wheel 17 functions as a nut and serves to advance the vertical shaft 18 and the wheel support 12 relative to the feed screw 14 an amount sufficient for the caliper 50 and its associated control system to signal that the workpiece W is ground to the desired dimension and the end of the grinding operation has been reached. Since two binary numbers are equal if a first number plus the bit by bit complement of a second number results in all ones, the adder 64 functions to provide at its four sum outputs, signals representing logical one conditions which are fed as four inputs to the AND circuit 66. An additional input of the AND circuit 66 is also provided with a one condition as a result of the match of a previous digit as will be more fully explained below. The output from the AND circuit 66 which appears when all its inputs are in a logical one condition, is connected as a retract control signal to the feed valve controller 41 by lead 49.

The appearance of a control signal on lead 49 indicates that the grinding operation is complete, thereby causing the feed valve controller 41 via hydraulic conduits 42 and 43 to cause retraction of the rapid feed piston 15 and the grinding feed piston 23 to reset these elements of the feed mechanism.

The appearance of the retract control signal on lead 49 also will cause a fixed number of reciprocations of the piston 39, via one of the pneumatic conduits 44, and the pawl 36 connected thereto to rotate the ratchet 34 and the worm 31 in a direction to cause reverse rotation of the feed screw 14 to retract or reset the wheel support 12 and grinding wheel 13 a fixed amount from the point to which they have been advanced during the previous rapid, grinding and incremental feed movements.

It will be appreciated, in some applications, that the desired dimension of a workpiece as a result of a rapid feed movement and a grinding feed movement may not be sufficiently close to the desired dimension of the workpiece so that only the last significant digit differs. Thus, it may be desirable to match other significant digits in addition to the last significant digit.

Turning again to FIG. 2, it is to be noted that the control system as illustrated therein is arranged to respond to five significant digits. Let it be assumed that upon the end of the grinding feed movement, the caliper 50 provides an output which indicates that none of five significant digits correspond to the desired five significant digits either indicated by the card reader 57 or the visual indicators 61 associated with dimension setting switches 62. The encoder 51 supplies binary signals to the wiring 59 indicating the sensed dimension of the workpiece W and binary signals by encoder 60 or the card reader 57 via the input selector 58.

Binary signal data representing the highest significant digit of the five digits involved sensed by the caliper 50 is compared in the comparator 52 with binary data appearing on wiring 63 which represents the desired most significant digit. When the two inputs to the comparator 52 become equal, the comparator provides an output signal indicating a match which is fed to the next succeeding comparator 53 as one of the inputs to an AND circuit (not illustrated) which corresponds to the AND circuit 66 forming part of the comparator 56. Each of the comparators 53–55 sequentially operate to determine a match on succeeding lesser significant digits until, the first four significant digits are matched establishing a match signal on the output from the comparator 55 which is fed as one of the input signals for the AND circuits 66 and 67.

As can be seen from the brief foregoing discussion of the control system operation the AND circuit 67 supplies a control signal to the lead 48 as an advance signal for the feed valve controller 41 only when the match of a previous digit as signalled by the comparator 55 has taken place, and the carry output from the adder 64 signals that the last significant digit as sensed by the caliper 50 is not yet equal to the desired magnitude for the digit. As before, the AND circuit 66 signals the feed valve controller 41 that the grinding operation is complete when the adder 64 indicates that the last significant digits are equal and the preceding comparator signals a match of the preceding digit.

As illustrated in FIG. 2, the control system is arranged so that only the last significant digit actually controls the incremental feed movement, the control becoming effective upon the receipt of a signal from a previous comparator indicating that all preceding digits have been matched. If it is desired that additional higher order digits also be utilized to control the incremental feed, it will be understood that modification can be made. For example, the terminals 68–70 and lead 48 could be connected to an OR circuit (not shown) which has its output, in turn, connected to the advance input for the feed valve controller 41 thereby providing an advance signal so long as any or all of the digits are not matched. It will also be appreciated that all of the information can be cascaded by the use of appropriate connections and logic circuit means.

It is to be understood that although the invention has been specifically described in conjunction with a grinding machine 10 and the feed mechanism, as illustrated in FIG. 1, has been specifically limited to the positioning of a support for grinding wheel 13, the invention is not so limited. It is to be understood that the invention may be utilized in other types of machine tools as well. It is also to be understood that in certain machines, it may be more feasible or desirable to hold the machining element in a relatively fixed position to advance and retract the workpiece.

It will also be appreciated that although the invention, in a preferred aspect, is related to the control of machine tools, the invention is not so limited and is a control system which may be used in conjunction with other types of apparatus and in process control environments as well.

While one embodiment of the invention has been shown for purposes of illustration, it is to be understood that various changes in the details of construction and arrangement of parts may be made without departing from the spirit and scope of the invention as defined in the appended claims.

What is claimed is:

1. In a control system for a machine tool in which a tool and a workpiece are adapted for relative advance and retraction therebetween, said control system comprising in combination:
   first gate means for effecting relative advance between a tool and a workpiece,
   second gate means for effecting relative retraction between the tool and the workpiece;
   sensing means sensing the instantaneous dimension of the workpiece for producing an output representing at least the last significant digit of such dimension as a parallel-bit digital word;
   reference means for producing an output which is the parallel-bit complement of that digital word representing the desired value to which said last significant digit of the workpiece dimension is to be reduced;
   adder means having the output of said sensing means and of said reference means as respective inputs thereto for producing a first output only when the sum of such inputs produces a carry and a second output only when said parallel-bit complement is the complement of the input from said sensing means; and
   enabling means for enabling said first and said second gate means when the other digits of the workpiece dimension are equal to desired values, and said first output of the adder means being connected to said first gate means to cause relative advancing between the tool and workpiece when such first output is present and said second output of the adder means being connected to said second gate means to cause relative retraction between the tool and workpiece when such second output is present, whereby automatically to reduce the workpiece dimension to the desired value and then to effect relative retraction between the tool and workpiece.

2. In a control system as defined in claim 1 wherein said enabling means includes a second adder means and third gate means; said sensing means having a second output representing the next-to-last significant digit of the sensed dimension as a second parallel-bit digital word; said reference means having a second output which is the complement of that digital word representing the desired value to which said next-to-last significant digit of the workpiece dimension is to be reduced; said second outputs of the sensing means and the reference means being connected as respective inputs to said second adder means; said second adder means having a first output only when the sum of its inputs produces a carry and a second output only when said second parallel bit word is the complement of the other input to the second adder means; said second output of the second adder means being connected as an input to said third gate means; and said third gate means having an output connected as inputs to said first and second gate means to complete the inputs thereto.

3. In the control system as defined in claim 2 wherein the second outputs of said first and second adder means are the parallel-bit digital sums of the respective inputs thereto.

4. In the control system as defined in claim 3 wherein said first, second and third gate means are AND gates.

5. In the control system as defined in claim 1 wherein said second output of said adder means is the parallel-bit digital sum of the inputs to said adder means.

6. In the control system as defined in claim 5 wherein said first and second gate means are AND gates.

7. In a control system for a machine tool adapted to effect relative advance and retraction between a tool and a workpiece, in combination;

sensing means for producing a plurality $m$ of digital word outputs representing the instantaneous values of a corresponding plurality of decimal digits which, in descending order of significance, are digits representing of value of the instantaneous dimension of the workpiece;

reference means for producing a plurality $m$ of outputs which are the digital word complements of those digital words representing the desired values to which said decimal digits of descending order to significance are to be reduced;

a plurality $m$ of adder means, each having corresponding outputs of corresponding ones of said sensing means and said reference means as inputs thereto, each for producing a carry output only when the digital word input from said corresponding reference means is greater than the digital word input from said corresponding sensing means and a parallel-bit logical "ones" output only when its inputs are complements, whereby said carry output indicates that the sensed decimal digit of the particular significance involved is greater than the desired value of such digit and said logical "ones" output indicates equality between the sensed value of the decimal digit and the desired value thereof;

first AND gate means for each of said adder means;

second AND gate means for each of said adder means;

each first AND gate means having said parallel-bit logical "ones" output of a corresponding adder means as $n-1$ inputs thereto, each said second AND gate means having the carry output of the corresponding adder means as one of two inputs thereto;

the first AND gate means corresponding to said digit of least significance having an output for effecting relative retraction between the tool and the workpiece, said second AND gate means corresponding to said digit of least significance having an output for effecting relative advance between the tool and the workpiece; and said first AND gate means corresponding to the other digits of significance being connected as the second inputs to the second AND gate means and as the last input to the first AND gate means corresponding to the next lower order of significance in each case, whereby said second AND gate means corresponding to said digit of least significance causes relative advance between the tool and workpiece only when all of the other sensed digits correspond with the desired values thereof and, as soon as said sensed digit of least significance reaches equality with the desired value thereof, said first AND gate means corresponding to the digit of least significance causes relative retraction between the tool and workpiece.

8. In a control system as defined in claim 7 wherein said sensing means comprises a caliper engaging the workpiece and having an analog output indicating the sensed dimension thereof, and encoder means for converting said analog signal to said plurality of digital word outputs in parallel, each such word being of parallel-bit form.

9. In a control system as defined in claim 8 wherein said reference means comprises reference dimension signal generating means for producing parallel-bit digital words corresponding to said plurality of desired decimal digits and bit by bit complement means for each such parallel-bit digital word providing the corresponding sensing mean input to a corresponding one of said plurality of adder means.

10. In the control system as defined in claim 7 wherein the output of said second AND gate means corresponding to each of said other digits is available for effecting relative advance between the tool and workpiece.

* * * * *